US011919243B2

(12) United States Patent
Herzog

(10) Patent No.: US 11,919,243 B2
(45) Date of Patent: Mar. 5, 2024

(54) METHOD FOR PRODUCING A THREE-DIMENSIONAL COMPONENT

(71) Applicant: Concept Laser GmbH, Lichtenfels (DE)

(72) Inventor: Frank Herzog, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

(21) Appl. No.: 17/577,578

(22) Filed: Jan. 18, 2022

(65) Prior Publication Data
US 2022/0134671 A1 May 5, 2022

Related U.S. Application Data

(62) Division of application No. 15/566,210, filed as application No. PCT/EP2016/057506 on Apr. 6, 2016, now Pat. No. 11,247,400.

(30) Foreign Application Priority Data

Apr. 22, 2015 (DE) .......................... 102015106218.6
Aug. 19, 2015 (DE) .......................... 102015113700.3

(51) Int. Cl.
*B29C 64/386* (2017.01)
*B22F 10/28* (2021.01)
(Continued)

(52) U.S. Cl.
CPC ............ *B29C 64/386* (2017.08); *B22F 10/28* (2021.01); *B22F 10/38* (2021.01); *B22F 10/85* (2021.01);
(Continued)

(58) Field of Classification Search
CPC ..... B29C 64/386; B29C 64/153; B33Y 10/00; B33Y 50/00
(Continued)

(56) References Cited

U.S. PATENT DOCUMENTS 5,764,521 A 6/1998 Batchelder et al.
7,833,465 B2 11/2010 Larsson
(Continued)

FOREIGN PATENT DOCUMENTS

CN 102581490 A 7/2012
DE 202010010771 U1 11/2011
(Continued)

*Primary Examiner* — Jeffrey M Wollschlager
*Assistant Examiner* — Xue H Liu
(74) *Attorney, Agent, or Firm* — Dority & Manning, P.A.

(57) ABSTRACT

The invention relates to a method for manufacturing a three-dimensional component 14 by means of an additive construction method in which the component 14 is constructed by solidifying construction material 9 that can be solidified using radiation 18, especially a selective laser melting method or a selective laser sintering method, in which the component 14 is produced by successively solidifying construction material 9 that can be solidified using the impact of radiation 18 by melting or sintering, comprising the following features: providing an additive construction apparatus 1, especially an SLM apparatus or an SLS apparatus, comprising a process chamber 3, a construction platform 7 for carrying the construction material 9, and a radiation source arranged above the construction platform 7 for generating a point-type or linear energy input for creating a melting or sintering section in the construction material 9, providing a sensor apparatus 31 for selective detection of created melting or sintering sections and for the generation of sensor values therefrom for characterizing the melting or sintering sections, and storage of said sensor values together with coordinate values localizing the sensor values in the component 14, determination of load and flux information in the component 14 manufactured or to be manufactured by means of a calculation or measuring method for determining critical load areas in the component 14 manufactured or to be manufactured, spatial correlation of the sensor values
(Continued)

determined for the evaluation of the component quality together with the coordinate values localizing said values with coordinates of the load and flux information, and assessment of the component 14 finished or to be finished, such that components 14 for which sensor values negatively impacting the component quality are determined in the range of critical or highly loaded sections of the load and flux information are classified as components 14 not corresponding to the requested component quality, and components 14 for which sensor values negatively impacting the component quality are determined with sufficient distance from critical or highly loaded sections of the load and flux information are classified as components 14 corresponding to the requested component quality.

20 Claims, 2 Drawing Sheets

(51) Int. Cl.
| | | |
|---|---|---|
| *B22F 10/38* | (2021.01) | |
| *B22F 10/85* | (2021.01) | |
| *B22F 12/90* | (2021.01) | |
| *B29C 64/153* | (2017.01) | |
| *B33Y 10/00* | (2015.01) | |
| *B33Y 50/00* | (2015.01) | |
| *B33Y 50/02* | (2015.01) | |

(52) U.S. Cl.
CPC ............ *B22F 12/90* (2021.01); *B29C 64/153* (2017.08); *B33Y 10/00* (2014.12); *B33Y 50/00* (2014.12); *B33Y 50/02* (2014.12); *Y02P 10/25* (2015.11)

(58) Field of Classification Search
USPC .......................................................... 264/194
See application file for complete search history.

(56) References Cited

U.S. PATENT DOCUMENTS

| 8,658,076 B2 | 2/2014 | El-Siblani |
| 8,701,359 B2 | 4/2014 | Packer et al. |
| 8,984,955 B2 | 3/2015 | Mouri |
| 10,900,890 B2 | 1/2021 | Hess et al. |
| 2011/0135840 A1 | 6/2011 | Doye et al. |
| 2013/0168902 A1 | 7/2013 | Herzog et al. |
| 2015/0024233 A1 | 1/2015 | Gunther |
| 2015/0367453 A1 | 12/2015 | Herzog |

FOREIGN PATENT DOCUMENTS

| DE | 102013003937 A1 | 9/2014 |
| JP | 2008164029 A | 7/2008 |
| JP | 2008307558 A | 12/2008 |
| JP | 2012059782 A | 3/2012 |
| JP | 2013/532592 A | 8/2013 |
| JP | 5946449 B2 | 7/2016 |
| JP | 2018/513797 A | 5/2018 |
| WO | WO2014135137 A2 | 9/2014 |

| Fault: | ⊕ | very critical |
| Fault: | ⊗ | critical |
| Fault: | ✕ | non-critical |

METHOD FOR PRODUCING A THREE-DIMENSIONAL COMPONENT

CROSS REFERENCE TO RELATED APPLICATIONS

This application is a divisional of U.S. application Ser. No. 15/566,210 filed on Oct. 12, 2017, titled "METHOD FOR PRODUCING A THREE-DIMENSIONAL COMPONENT", which was a United States national stage entry of International Application serial no. PCT/EP2016/057506 filed Apr. 6, 2016, which claims priority to German Patent Application serial no. 10 2015 106 218.6 filed Apr. 22, 2015, and German Patent Application serial no. 10 2015 113 700.3 filed Aug. 19, 2015, the contents of which are herein incorporated by reference in their entirety.

The invention relates to a method for manufacturing a three-dimensional component by means of an additive construction method, comprising the other features of the preamble of claim 1.

From EP 11 779 556.7, a method for manufacturing three-dimensional components is known in which the component is constructed additively, i.e., by solidifying construction material that can be solidified using radiation. Addressed is especially a selective laser melting method or a selective laser sintering method; in such methods, the powdery construction material is molten or at least sintered by a laser beam. For this, an additive construction apparatus is provided, especially what is known as an SLM or SLS apparatus, which has a process chamber, a construction platform for carrying the construction material, and a radiation source arranged above the construction platform. The radiation source is able to generate a point-type or linear energy input for creating a melting or sintering section in the construction material. The beam of the radiation source is guided over a scanner; the scanner is controlled by a processor and ensures that the beam of the radiation source, especially a laser beam, selectively solidifies the construction material which is applied in thin layers, i.e., solidifies only on such positions that later form a section of the component.

In the above-mentioned patent application it is already known to provide a sensor apparatus which selectively detects melting or sintering sections created by the laser beam and generates from that sensor values for characterizing the melting or sintering sections. The form of the melting or sintering sections allows for making statements on the component quality. These sensor values are stored together with the coordinate values localizing the sensor values in the component.

Starting out from that, the invention is based on the object to design a method having the features of the preamble of claim 1 such that advanced statements can be made on the component strength and already produced and possibly partly defective components can be classified into "sufficiently loadable" or "not sufficiently loadable." This object is solved by the characterizing features of claim 1; advantageous further developments result from the dependent claims 2-10.

As the core of the invention it is considered to determine flux and load information that is decisive for the components to be produced or determined in already produced components by means of a measuring method. Thus, critical or highly loaded load areas in a component to be produced or already produced can be determined in the normal manner first. Then, the sensor values determined for evaluating the component quality and the coordinate values localizing them are spatially correlated with the coordinates of the highly loaded or critical load and flux information. This information obtained in different ways is, so to speak, electronically "superimposed," i.e., spatially correlated, and during that it is checked whether component faults, which are characterized by the sensor values, lie on or close to coordinates that are decisive for the load and flux information.

Load and flux information can also be referred to as flux lines; the flux can be represented graphically in the form of lines in illustrations of a component. If component faults lie in critical or highly loaded zones of these flux lines, this would mean that the component is weakened considerably by a possibly existing construction fault inside the component in the range of a flux line and therefore has to be considered as scrap, or that components, although containing one or more or even many component faults, can be classified as highly loadable because the component faults—determined and characterized by the sensor values—are located at a sufficient distance from the flux lines or flux areas.

The sensor values are advantageously represented by means of a visualization device in a multidimensional representation referred to their place of detection inside the component. The same also applies to the coordinates of the critical load and flux information, which can be represented graphically as lines or areas.

To enable an operator to quickly decide whether continuing the production of the component is critical or noncritical if component faults occur, sensor values negatively impacting the component quality can advantageously be visually highlighted. Thus, the operator sees on the visualization device the component in two- or multidimensional representation, critical flux areas or flux lines can be graphically inserted into this component and displayed visually, and during the construction process the sensor values possibly negatively impacting the quality of the component detected by the sensors can be represented as well. An operator then immediately sees visually whether more or less large-scale construction faults lie in the flux area or just close to or far from one.

For example, if the construction material is molten insufficiently in a lateral area of the component completely negligible with regard to the critical flux in the component, construction can be continued; such a construction fault will not in the least impact the load capacity of the component. Whereas, if a construction fault lies in the middle of a critical area on a flux line that was calculated before, caution is advised when using such a component, as insufficient melting in the range of a flux line or flux area can lead to break of the component. Either an operator or a processor connected to the apparatus is able to abort the construction process when determining sensor values negatively impacting the component quality in the range of load and flux information or flux lines or flux areas.

However, it is also possible to initiate a repair process, i.e., when determining insufficient melting, e.g. as a result of insufficient powder coating, to apply another powder layer on the already solidified section of the component and then remelt and thus repair the critical section that led to the negative sensor value, i.e., set it to a state in which this previously not loadable section, too, fulfills highest load requirements.

In consequence of the method it is possible to mark the components produced or to be produced as sufficient for different safety requirements depending on the determined distances of the sensor values possibly negatively impacting the component quality, i.e., sensor values which prove, e.g., insufficient melting in a component section of load and flux information or lines or areas. For this purpose it is advisable to define different security requirement levels so that, e.g., components for which negative sensor values in consequence of insufficient sectional melting have not been detected or only in noncritical component sections are classified as highly loadable and components for which melting faults and associated sensor values in critical load areas have been detected are classified as complete scrap. In between it is possible to allow components with construction faults that are, however, spatially distanced from the flux lines as loadable, e.g., as "second or third quality."

Advantageously, it is possible to print or store a representation of the sensor values and load and flux information as a graphically represented quality control construction log.

The invention is explained in more detail by means of exemplary embodiments in the figures of the drawings. In which.

Figure 1:
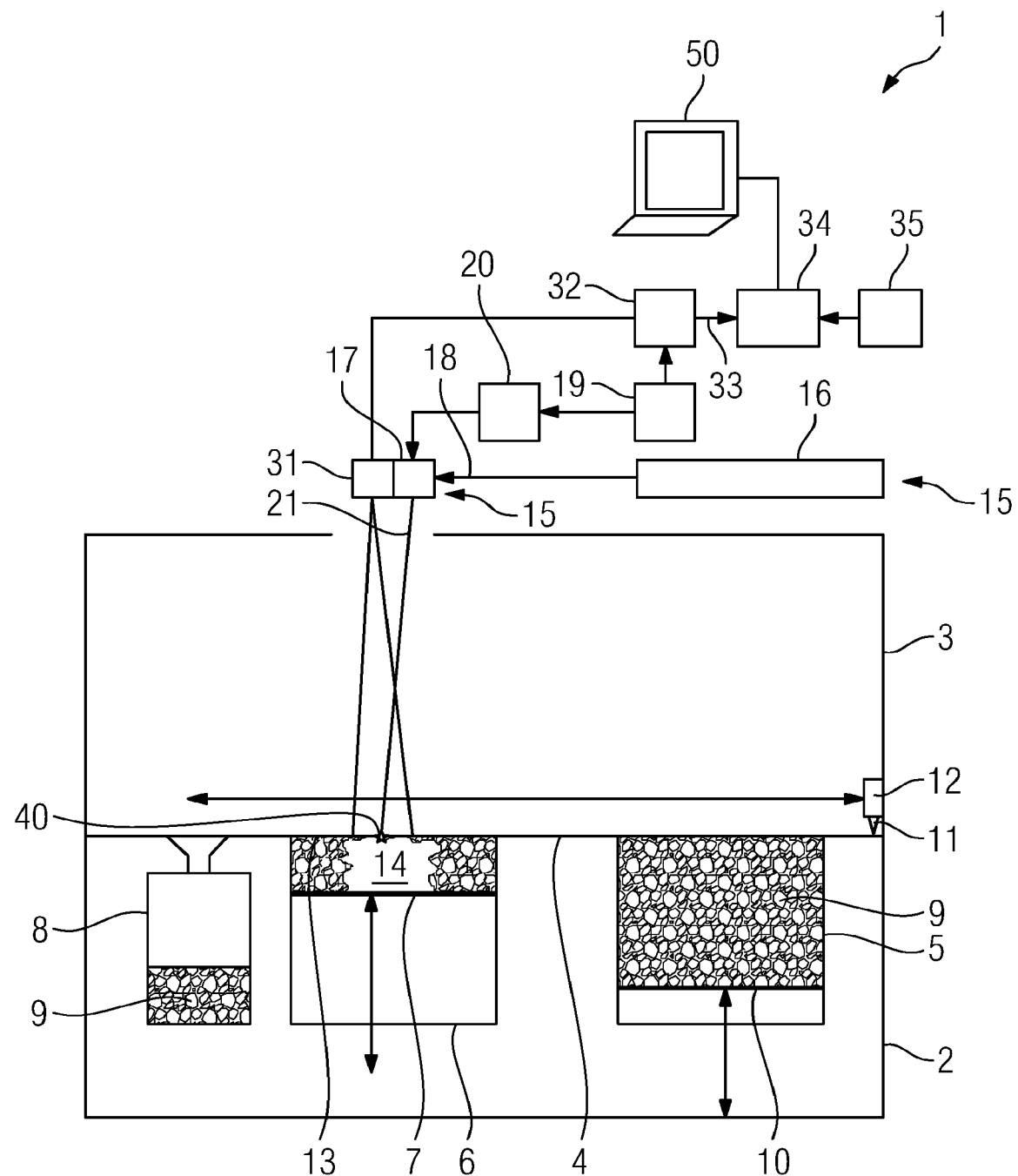
FIG. 1 shows a schematic diagram of an additive construction apparatus used for performing the method.

The additive construction apparatus 1 shown in FIG. 1 in the form of an SLM apparatus has a housing 2 in which a process chamber 3 is arranged, wherein in the range of a process chamber floor 4 a construction material reservoir 5, a construction room 6 with a height-movable construction platform 7, and an overflow container 8 are arranged. Powdery construction material 9 is conveyed from the reservoir 5 by means of a coater 12 with a coating blade 11 to the construction room 6 and there applied on an already existing powder layer 13 or the surface of a partially finished component 14. Construction material that is not required is discarded by the coater 12 into the overflow container 8. Above the process chamber, an irradiation device 15 is arranged, which comprises a laser 16 as radiation source and a scanner 17 for deflecting the laser radiation 18. The scanner 17 is controlled by a processor 20, which processes construction data from a storage 19.

A sensor apparatus 31 in the form of, for example, a camera detects the shape and size of a melt spot 40 and generates from that sensor values in a processor 32, which are furnished to another processor 34 via an output 33 together with the coordinates localizing them from the storage 19. It should be noted that processing can also take place in the processor 20; however, for the sake of clarity, the two processors 20 and 34 are illustrated separately.

With regard to the component 14 to be manufactured, it is determined by means of a calculation or measuring method where critical load areas exist inside the component 14. These areas are stored as load and flux information in a storage 35 and from there provided to the processor 34.

Figure 2:
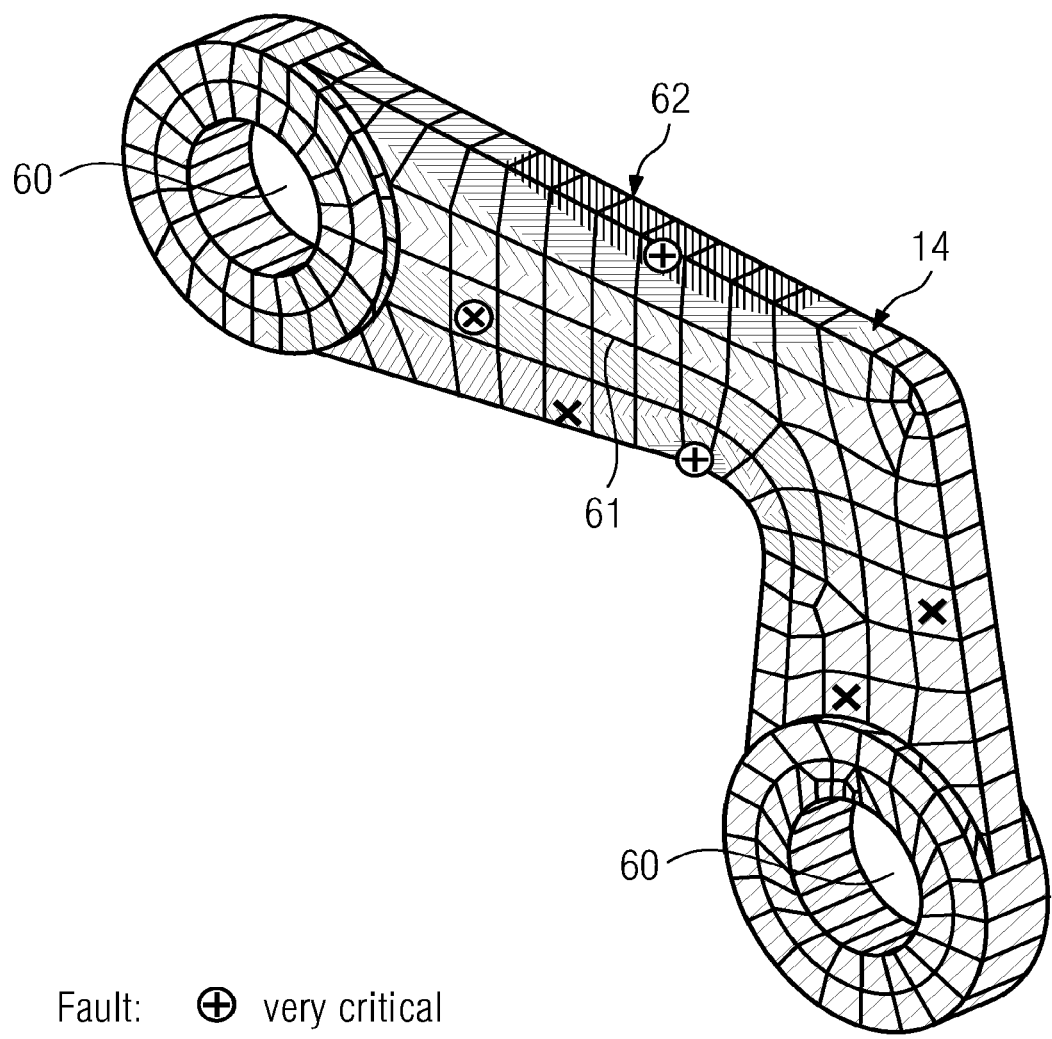
FIG. 2 shows a simplified schematic diagram of an elongated component with graphically represented load areas or flux lines and the position of construction faults determined by sensor values referred to the load area or flux lines.

The processor 34 now correlates the position of the sensor values representing possible construction faults from the storage 32 with the load and flux information stored in the storage 35, which is, of course, also assigned spatially localizing coordinate values. The correlation result is output via a visualization device 50 and can be represented graphically, for which reference is made to FIG. 2. In the illustration shown in FIG. 2, loads and fluxes are represented by shadings. Different loads or different fluxes are represented by different shadings.

This figure shows a greatly schematized component 14 of elongated angular form, which is formed, e.g., as an elongated lever element and, e.g., provided with two pivot bores 60. By means of these pivot bores 60 through which forces are passed into the component 14, load and flux coordinates can be calculated and represented graphically as flux lines 61 or flux area 62. This load information, e.g., load information as "von Mises yield criterion," has different values, namely from almost zero to maximum values. Usually, it has to be checked whether the maximum stress occurring on a component is in all areas smaller than the permissible stress, e.g., the yield stress of the material used for the component.

It is thus possible to determine load information for all elements or areas of the component. From this load information, the critical or highly loaded areas are determined and then checked according to the invention whether or not sensor values negatively impacting the component quality are detectable in the range of such critical or highly loaded areas of the load or flux information.

The flux lines 61 or flux area 62 graphically represent the "load-bearing" part of the component. In critical zones of these areas 61, 62, the component 14 should be constructed as faultless as possible, i.e., no critical sensor values should occur there.

The sensor apparatus 31 of the construction apparatus 1 now determines sensor values together with coordinate values localizing them, which are illustrated exemplarily. The sensor values illustrated as ⊕ lie on the flux lines 61 or at least in the range of the flux area 62 and have a very critical impact on the load capacity of the component 14.

The construction faults indicated by ⊗ reduce the quality of the component 14. However, the construction faults represented by that are not to be classified as extremely critical.

The X construction faults lie outside the load-bearing areas 61, 62 of the component 14 and are therefore non-critical. The distance of the construction faults from the flux lines 61 or flux area 62 can be represented graphically and measured. Construction faults that lie on the flux lines 61 are automatically visually highlighted so that they are readily identifiable. Depending on the position of the construction faults it may be possible to apply another layer with the coater 12 on a critical component area and remelt it by means of the laser beam 21 to improve the strength of the component 14 by way of an "in-process repair."

LIST OF REFERENCE NUMBERS

1 Construction apparatus
2 Housing
3 Process chamber
4 Process chamber floor
5 Reservoir
6 Construction room
7 Construction platform
8 Overflow container
9 Construction material
11 Coating blade
12 Coater
13 Powder layer
14 Component
15 Irradiation device
16 Laser
17 Scanner
18 Laser radiation
19 Storage
20 Processor
21 Laser beam 31 Sensor apparatus
32 Processor
33 Output of 32
40 Melt spot
50 Visualization device
60 Pivot bore
61 Flux line
62 Flux area

The invention claimed is:

1. A system for additively manufacturing three-dimensional objects, the system comprising:
   an additive manufacturing machine comprising an irradiation device configured to selectively melt and/or sinter sequential layers of construction material to form a component;
   a sensor apparatus configured to detect sensor values corresponding to melting and/or sintering characteristics of the construction material by the irradiation device;
   a processor; and
   a memory storage, the memory storage comprising computer-executable instructions, which when executed by the processor, cause the processor to:
   determine sensor values corresponding to melting and/or sintering characteristics detected by the sensor apparatus when the irradiation device selectively melts and/or sinters the sequential layers of construction material to form the component, the sensor values being spatially localized with respect to coordinates of the component;
   determine a localized quality for one or more load bearing areas and/or critical load areas of the component being additively manufactured in the additive manufacturing machine, the one or more load bearing areas and/or critical load areas defined at least in part by spatially localized load and flux information, the localized quality determined based at least in part on sensor values having a spatial location corresponding to the one or more load bearing areas and/or critical load areas of the component; and
   classify the component while being additively manufactured with respect to overall quality based at least in part on the localized quality for the one or more load bearing areas and/or critical load areas of the component;
   wherein classifying the component with respect to overall quality comprises determining that one or more sensor values indicating an actual or potential negative localized quality are spatially localized to an area having a defined distance from the one or more load bearing areas and/or critical load areas, wherein the defined distance depends on a safety classification of the component.

2. The system of claim 1, wherein the memory storage, when executed by the processor, further causes the processor to perform a repair process upon at least a portion of the component when one or more sensor values indicating an actual or potential negative localized quality spatially correspond to a respective one of the one or more load bearing areas and/or critical load areas.

3. The system of claim 2, wherein the repair process comprises further selectively melting and/or sintering at least one layer of construction material with radiation from the additive manufacturing machine at least at a region of the at least one layer corresponding to a respective one of the one or more load bearing areas and/or critical load areas.

4. The system of claim 3, wherein the memory storage, when executed by the processor, further causes the processor to:
   determine sensor values corresponding to melting and/or sintering characteristics detected by the sensor apparatus when performing the repair process;
   determine a localized quality for one or more load bearing areas and/or critical load areas of the component being or having been subjected to the repair process; and
   re-classifying the component with respect to overall quality after being or having been subjected to the repair process.

5. The system of claim 1, wherein the memory storage, when executed by the processor, further causes the processor to abort additively manufacturing the component when one or more sensor values indicating an actual or potential negative localized quality spatially correspond to a respective one of the one or more load bearing areas and/or critical load areas.

6. The system of claim 1, wherein the memory storage, when executed by the processor, further causes the processor to store a result from classifying of the component with respect to overall quality.

7. The system of claim 1, comprising:
   a visualization device configured to display a graphical representation provided by the processor, the graphical representation comprising the sensor values and the one or more load bearing areas and/or critical load areas of the component respectively spatially localized in a two-dimensional or multidimensional illustration of the component.

8. The system of claim 7, wherein the graphical representation further comprises visually highlighting at least a portion of a respective one of the one or more load bearing areas and/or critical load areas when one or more sensor values spatially corresponding thereto indicate an actual or potential negative localized quality.

9. The system of claim 7, wherein the load and flux information comprises a plurality of flux areas and/or flux lines.

10. The system of claim 1, wherein classifying the component with respect to overall quality comprises classifying the component with respect to a plurality of safety levels depending on the defined distance of the one or more sensor values indicating an actual or potential negative localized quality from the one or more load bearing areas and/or critical load areas.

11. The system of claim 1, wherein the additive manufacturing machine comprises a process chamber, the irradiation device, and the sensor apparatus.

12. The system of claim 11, comprising:
   a construction room.

13. The system of claim 11, wherein the additive manufacturing machine is configured to abort additively manufacturing the component responsive to an abort instruction from the processor, the abort instruction provided by the processor when one or more sensor values indicating an actual or potential negative localized quality spatially correspond to a respective one of the one or more load bearing areas and/or critical load areas.

14. A computer-readable medium comprising computer-executable instructions, which when executed by a processor, cause the processor to perform a method of classifying an additively manufactured component with respect to quality, the method comprising:
   determining sensor values corresponding to melting and/or sintering characteristics detected by a sensor apparatus when selectively melting and/or sintering sequential layers of construction material, the sensor values being spatially localized with respect to coordinates of the component;

determining a localized quality for one or more load bearing areas and/or critical load areas of the component being or having been additively manufactured, the one or more load bearing areas and/or critical load areas defined at least in part by spatially localized load and flux information, the localized quality determined based at least in part on sensor values having a spatial location corresponding to the one or more load bearing areas and/or critical load areas of the component; and classifying the component with respect to overall quality based at least in part on the localized quality for the one or more load bearing areas and/or critical load areas of the component;

wherein classifying the component with respect to overall quality comprises determining that one or more sensor values indicating an actual or potential negative localized quality are spatially localized to an area having a defined distance from the one or more load bearing areas and/or critical load areas, wherein the defined distance depends on a safety classification of the component.

15. The computer-readable medium of claim 14, wherein classifying the component with respect to overall quality comprises classifying the component with respect to a plurality of safety levels depending on the defined distance of the one or more sensor values indicating an actual or potential negative localized quality from the one or more load bearing areas and/or critical load areas.

16. The computer-readable medium of claim 14, wherein the localized quality comprises a strength property of the component.

17. The computer-readable medium of claim 16, wherein the strength property comprises a yield stress or a von Mises yield criterion.

18. The computer-readable medium of claim 14, wherein the melting and/or sintering characteristics comprise a shape and/or size of a melt pool.

19. The computer-readable medium of claim 14, wherein the method further comprises performing a repair process upon at least a portion of the component when one or more sensor values indicate an actual or potential negative localized quality spatially corresponding to a respective one of the one or more load bearing areas and/or critical load areas.

20. The computer-readable medium of claim 14, wherein the method further comprises aborting an additive manufacturing of the component when one or more sensor values indicate an actual or potential negative localized quality that spatially corresponding to a respective one of the one or more load bearing areas and/or critical load areas.

* * * * *